Sept. 12, 1961  L. J. E. REVORD  2,999,328
FISHING APPARATUS
Filed May 31, 1960  2 Sheets-Sheet 2
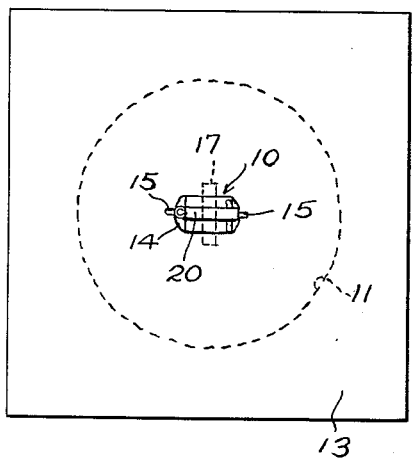
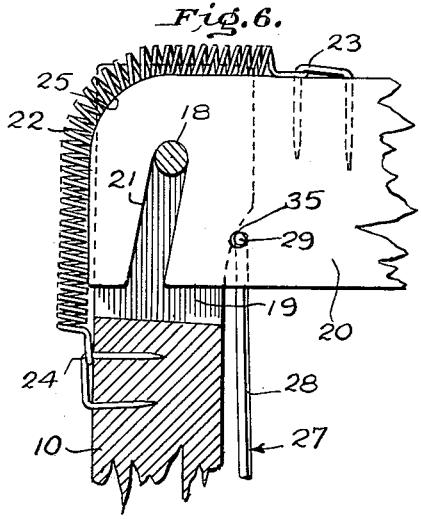
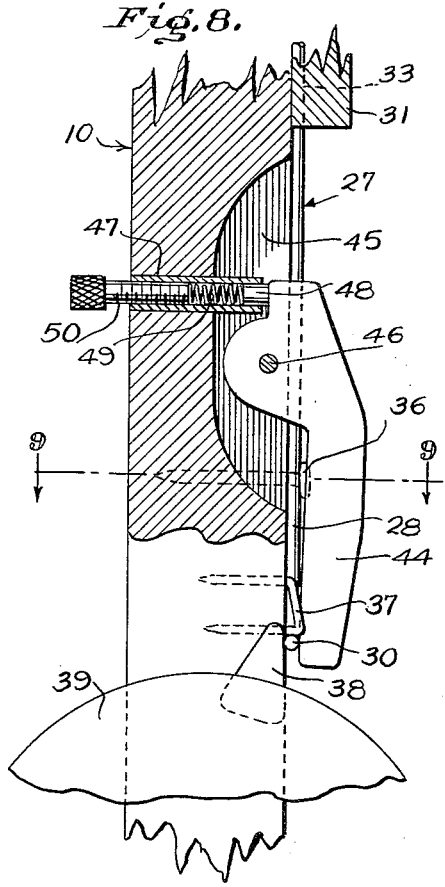
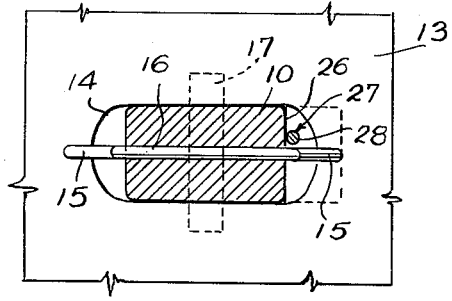
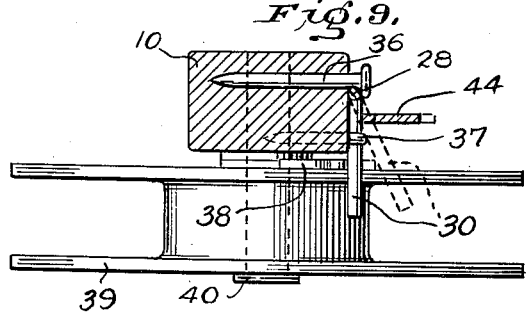
INVENTOR.
Leoniel J. E. Revord
BY Reginald W. Hoagland
ATTORNEY

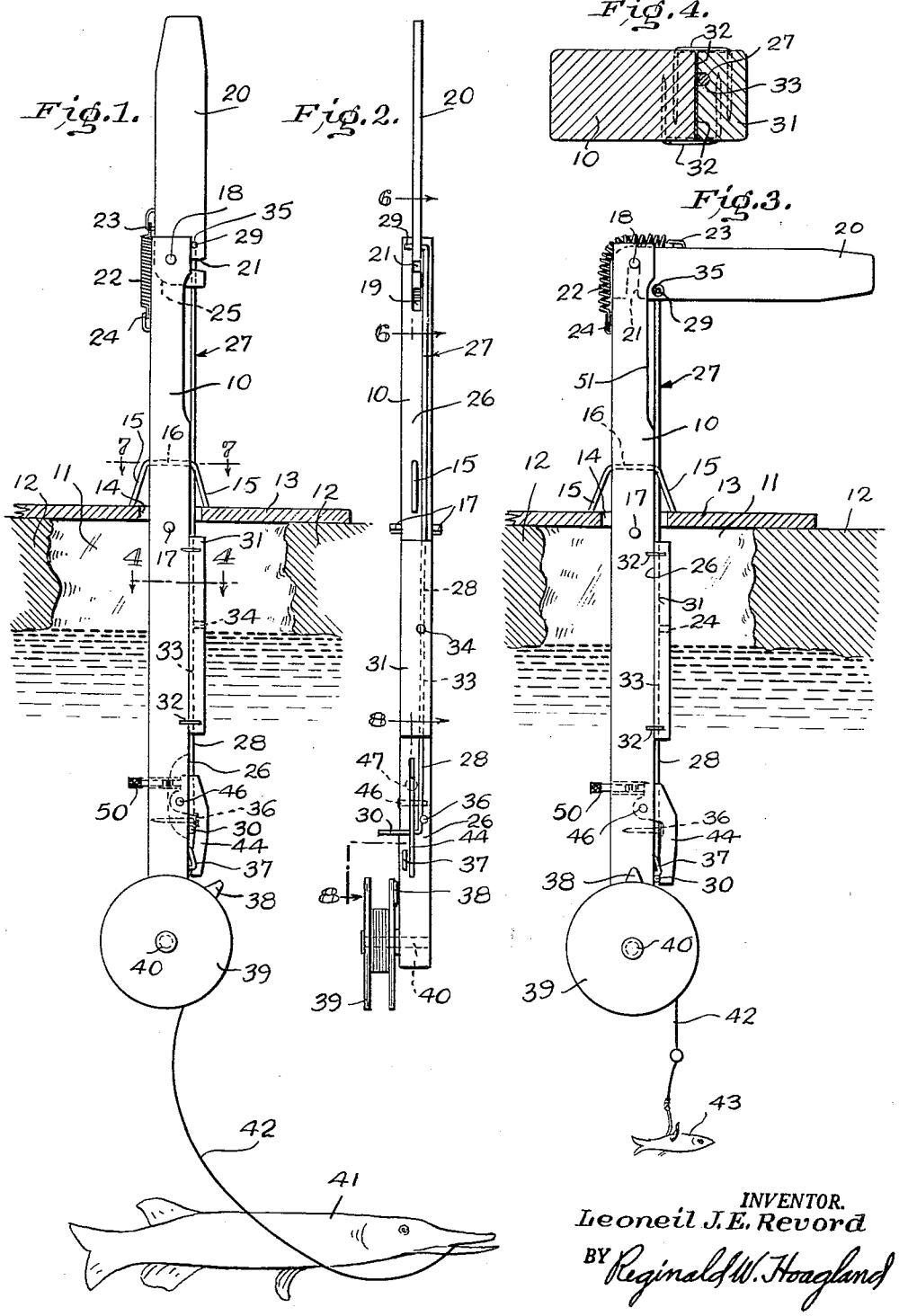

United States Patent Office 2,999,328
Patented Sept. 12, 1961

2,999,328
FISHING APPARATUS
Leoneil J. E. Revord, 1112 Louis Ave., Flint, Mich.
Filed May 31, 1960, Ser. No. 32,768
1 Claim. (Cl. 43—17)

This invention relates to fishing apparatuses and more particularly to the type commonly known as a "tip-up" for signaling a catch on a momentarily unattended line while ice fishing.

Generally, the present invention consists of an upstanding elongated body supported in a hole in the ice by a cross board removably held against movement lengthwise of said body, and resting on the upper surface of the ice. There is a reel, with the fishing line wound thereon, rotatably mounted on the lower end portion of the body and submerged in the water below the ice. A flag in the form of a spring actuated signal arm is pivoted to the upper end portion of the upstanding body and is held in a cock non-signaling position by a sear connected thereto and caught over a small stationary nub on said body. The sear is slidable lengthwise on and relative to the upstanding body, is slightly rotatable about its longitudinal axis, and has its catch located adjacent the reel and in the path of movement of a radial finger on said reel which engages and releases said sear from said nub upon rotation of the reel. Thus, the pull of a caught fish on the line will release the signal arm so that the spring tension thereon will move the same to a signaling position.

It is accordingly an object of the invention to provide a novel and improved fishing apparatus especially adapted for use in ice fishing.

Another object of the invention is to provide, in a device of the character set forth, a novel sear mechanism for releasing a spring actuated signal arm upon the catching of a fish therewith.

A further object of the invention is the provision in an apparatus of the class described, a novel construction of spring actuated arm for rendering a signal.

A still further object of the invention is to provide in a device of the character set forth, an adjustable pressure applying mechanism for determining the amount of pull necessary on the line to trip the signaling arm.

Still another object of the invention is to provide a simple and improved construction for both sildably and pivotally mounting a sear on an upstanding body member and wherein a side surface of the body member functions with the sear in the operation thereof.

It is also an object of the invention to provide a fishing apparatus of the above-indicated character, which is simple and subsantial in construction, economical to manufacture, and thoroughly efficient and practical in use.

These, together with various auxiliary features and objects of the invention which will later become apparent as the following description proceeds, are attained by the present invention, a preferred embodiment of which has been illustrated by way of example only, in the accompanying drawings, wherein:

FIGURE 1 is a side elevation of the improved fishing apparatus, showing a fish on the line and the signal arm released to assume a signaling position;

FIGURE 2 is a view at 90 degrees to that shown in FIGURE 1;

FIGURE 3 is a side elevation similar to FIGURE 1, but showing a bait on the line and the parts in position prior to catching a fish;

FIGURE 4 is a horizontal cross section taken on line 4—4 of FIGURE 1;

FIGURE 5 is a top plan of the apparatus;

FIGURE 6 is an enlarged fragmentary sectional side view of the upper portion of a fishing apparatus with the signal arm depressed past cocked position;

FIGURE 7 is also an enlarged fragmentary section, but taken on line 7—7 of FIGURE 1;

FIGURE 8 is a fragmentary elevation and sectional view taken substantially on line 8—8 of FIGURE 2; and FIGURE 9 is a cross section taken on line 9—9 of FIGURE 8 looking in a downward direction.

Referring now more particularly to the drawings, wherein like numerals designate similar parts throughout the various views, there is indicated generally by the numeral 10 an elongated body which is supported in an upstanding position extending through a hole 11 in ice 12 by a board 13 or like cross member resting on the ice 12 and bridging the hole 11 therein. The elongated body 10 is preferably constructed from a stick of wood, which is rectangular in cross section, as shown in FIGURES 4, 7 and 9 and which has attached thereto the various other elements of the apparatus. There is a hole 14 in the center of the board 13 of a length slightly greater than the width of the body 10 and of a width substantially equivalent to the thickness of said body 10 through which said body extends, as best shown in FIGURE 7. To permit separation and to limit endwise movement of the body 10 downwardly and relatively to the board 13 the opposite downturned ends 15 of a piece of spring wire 16 extending through the body 10 must be sprung inwardly in order to be passed through the opening 14 in the board 13. Another element in the form of a cross pin 17 is force fitted in a hole through the body 10 below and at right angles to the wire 16 for engagement of its protruding ends with the underside of the board 13 should there be upward movement of said body relative to said board.

Pivoted, as at 18, in a bifurcated upper end 19 of the elongated body 10 is an end of a blade-like signal arm 20 for swinging movement of said arm from a horizontal position to a vertical position. There is a slot 21 in the end position of the signal arm 20 which extends from a side edge thereof to its central portion and it is through this slot and in aligned holes through the forked branches of said bifurcation that the pivot pin 18 is positioned. A helical coil spring 22 has one of its ends secured, as at 23, to the edge of the signal arm 20 opposite to that from which the slot 21 extends and its other end, as at 24, to the side of the upper end portion of the body 10. The spring 22 is of an outside diameter slightly less than the space between the forked branches of the bifurcation 19 and the intersection of the end and the side edge to which the spring is attached is rounded, as at 25, so that the spring is wrapped around this curvature when the signal arm is in its horizontal position, as shown in FIGURES 3 and 6. The spring 22 besides actuating the signal arm 20 yieldably holds said signal arm in a position with the pivot pin 18 at the depth or bottom of the slot 21 in said arm. Thus, when not in use the slot 21 permits the pivotal joint to be disconnected for decreasing the size of the apparatus.

Along the side surface 26 of the elongated body 10 opposite to that on which the spring 22 is mounted and of a length slightly less than said body is a sear 27 constructed from a piece of stiff round wire and consisting of a main straight portion 28, a right angled upper end portion 29, and a right angled lower end portion 30 slightly longer and parallel with said upper angled portion 29. The straight central portion 28 of the sear 27 is held against the surface 26 of the body 10 by a fairly long bearing element 31 secured against said surface by gluing and stapling, as at 32, there being a groove 33 lengthwise in said bearing element through which said straight central portion 28 extends and which together with an enlarged hole 35, hereinafter described, permits the sear to rotate about its longitudinal axis. A hole 34 in the bearing element 31 leads to the groove 33 for supplying oil so as to keep the sear free in said bearing for rotation about its longitudinal straight portion 28 and also free for endwise sliding movement.

Because the signal arm 20 is centrally connected in the bifurcated upper end of the body 10 it is necessary that the straight portion 28 of the sear 27 be slightly off of the center of said body in order that the upper right angled portion 29 of the sear may extend through a hole 35, of diameter slightly greater than that of portion 29 of the sear, in signal arm. See FIGURE 2. This produces contact of said upper right angled portion 29 with both branches of the forked upper end of the body when the signal arm 20 is in both raised and completely lowered positions so as to dispose the lower right angled end portion 30 in contact with the surface 26 of the body 10. To further aid in maintaining said contact a head of a nail 36 driven in the body 10 partially overlies the straight central portion 28 of the sear 27 and against which said sear portion slides.

A nub 37 formed on the surface 26 of the body 10 is engaged by the lower right angled portion 30 of the sear for holding the signal arm 20 in a cocked position as clearly shown in FIGURES 8 and 9 of the drawing. When signal arm 20 has been depressed to a point where lower right angled end portion 30 contacts nub 37, portion 30 is cammed outward by the nub, rotating sear 27 slightly about its longitudinal axis. Hole 35, being oversized, permits sufficient traverse of upper end portion 29 of sear 27 therewithin so that lower end portion 30 will slide past nub 37. When signal arm 20 has been further depressed to a point where upper end portion 29 of sear 27 contacts body 10, both upper portion 29 and lower portion 30 of the sear will be forced into contact with surface 26 of the body. Signal arm 20 is then permitted to be elevated slightly by spring 22 until lower end portion 29 of sear 27 is engaged by the lower portion of nub 37. The device is thus cocked and signal arm 20 retained in a horizontal position. In this position hole 35 is slightly spaced outward from an inward sloping portion 51 in surface 26 of body 10, as best shown in FIGURE 3. The end portion 30 projects beyond the side of the body 10 and is in the path of movement of a radial finger 38 on a reel 39 rotatably mounted by a pin 40 on the lower end portion of the body 10. Upper end portion 29 of sear 27 is not in contact with portion 51 of body 10 when the signal arm is thus disposed in horizontal cocked position, and is free to traverse slightly within hole 35, so that lower end portion 30, and the entire sear 27, can rotate about the longitudinal axis of the sear to permit lower end portion 30 to be disengaged from nub 37 under pressure from finger 38. A fish 41 caught on a line 42 wound upon the reel 39 exerts a pull on the line which rotates the reel and engages the finger 38 with end portion 30 hooked under the nub 37. The direction of rotation of the reel is such that the sear is rotated about its longitudinal axis and in so doing disengages the portion 30 thereof from under the nub 37, which allows the spring 22 to move the signal arm from a horizontal position to a vertical position, thus, indicating that a fish has been caught.

Because of the difference in the line pull of different fish, as well as a difference in the line pull of live bait, such as shown at 43 in FIGURE 3, an adjustable pressure applying arm 44 is employed to resist disengagement of the end portion 30 from withunder the nub 37. The upper portion of the arm 44 is partially in a slot 45 in the body 10 and is pivoted to said body by a pin 46, while the depending lower portion of said arm engages the end portion 30 by crossing over same at substantially right angles. A sleeve 47 is transversely force fitted in the body 10 slightly above the pivot 46 for the arm 44 and has a plunger 48, spring 49 and screw 50 therein for applying different amounts of pressure in an outward direction to the upper end of the arm 44.

In view of the above description taken in conjunction with the accompanying drawings, it is believed that a clear understanding of the construction, operation, and advantages of the improved invention will be quite apparent to those skilled in this art. A more detailed description is accordingly deemed unnecessary.

It is to be understood, however, that even though there is herein shown and described a preferred embodiment of the invention, various changes may be made without departing from the spirit or full intendment of the invention.

What is claimed is:

An apparatus for fishing through a hole in ice, said apparatus comprising an elongated upstanding body supported in and extending through the hole in the ice, a reel, having an extension thereon, rotatably mounted on the lower end portion of the body and submerged in the water below the ice, a line wound upon said reel so as to rotate said reel upon a pull on said line, said upstanding body having its upper end bifurcated to form a pair of branches and having transverse aligned openings through said pair of branches, a signal arm having one of its end portions in said bifurcation, being slotted from a side edge thereof to substantially its central portion, and having an oversized aperture therein, a pivot pin in said aligned openings in said body and in the slot in said signal arm for pivotally mounting said signal arm for movement from a horizontal cocked position to a vertical signaling position, a coiled tension spring positioned along the outer side surfaces of said upstanding body and said signal arm and having its opposite ends fixed to said body and arm so as to stretch said spring partially around the pivotal connection when said signal arm is in a cocked position, and a sear mechanism having a catch portion engaging said enlarged aperture in said signal arm, a nub portion connected to said body, and a second catch portion on said sear mechanism and arranged to releasably engage said nub portion to hold said signal arm in horizontal cocked position and to be disengaged therefrom by rotary movement of said reel to release said spring activated signal arm from horizontal cocked position for movement to vertical signaling position.

References Cited in the file of this patent

UNITED STATES PATENTS

| | | |
|---|---|---|
| 434,426 | Costellow | Aug. 19, 1890 |
| 2,114,529 | Goodhue | Apr. 19, 1938 |
| 2,122,841 | Laurila | July 5, 1938 |
| 2,693,046 | Langevin | Nov. 2, 1954 |
| 2,908,100 | Mogren | Oct. 13, 1959 |